June 6, 1950   W. C. STARKEY   2,510,667
OVERLOAD TORQUE RELEASE DEVICE
Original Filed Nov. 1, 1943
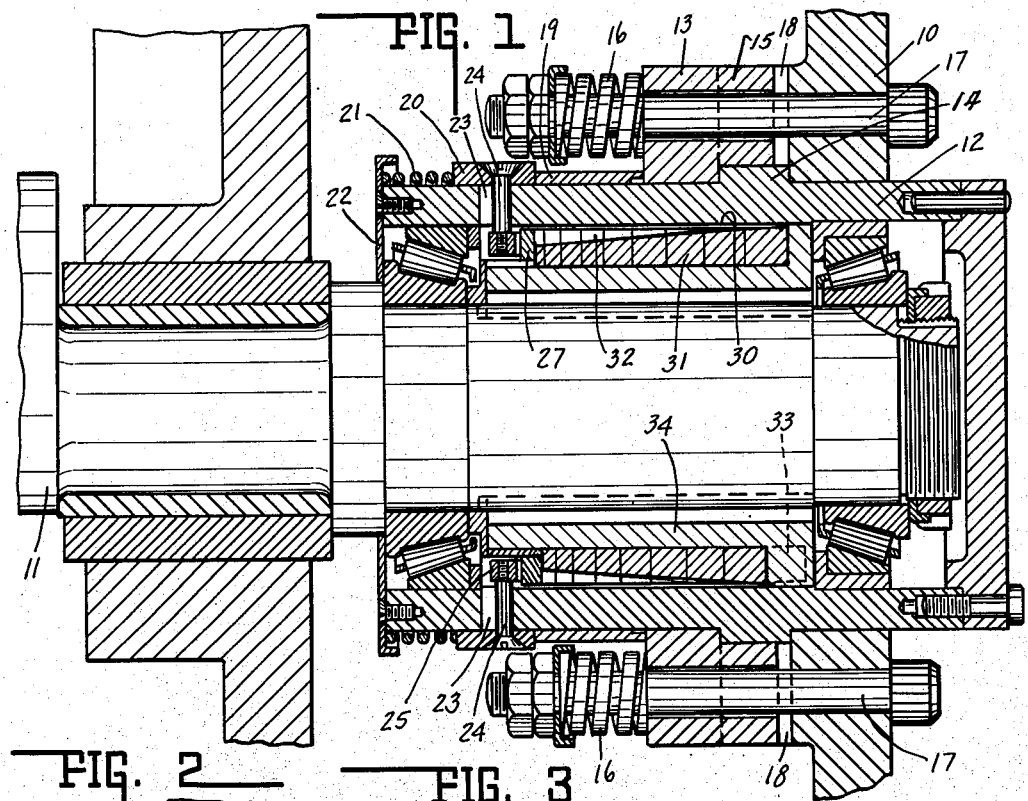
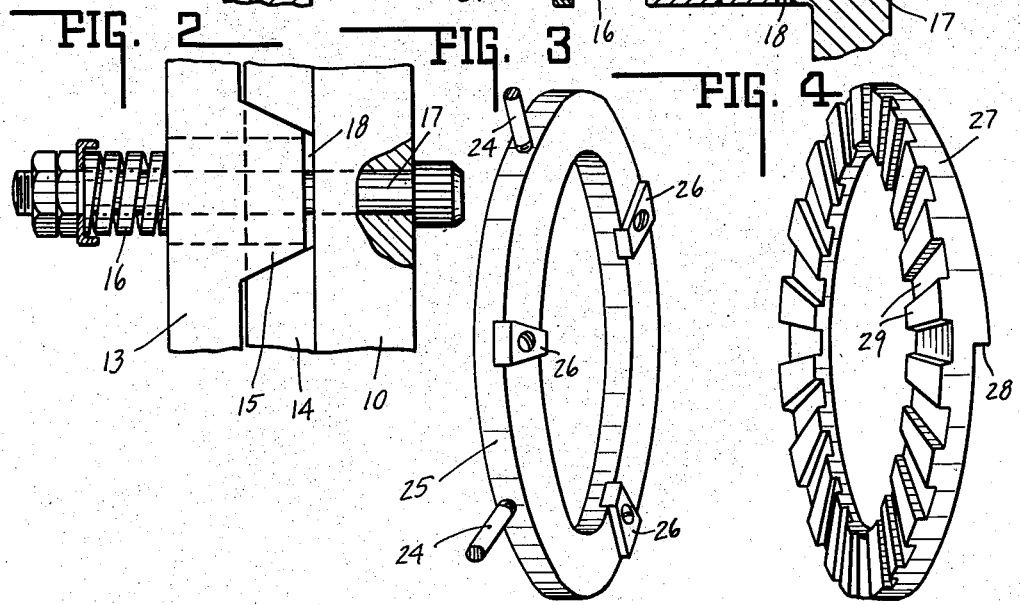
INVENTOR.
WILLIAM CARLETON STARKEY,
BY
Lockwood, Goldsmith & Galt,
ATTORNEYS.

Patented June 6, 1950

2,510,667

UNITED STATES PATENT OFFICE 2,510,667

OVERLOAD TORQUE RELEASE DEVICE

William Carleton Starkey, Indianapolis, Ind., assignor to Fletcher Trust Company, Indianapolis, Ind., a corporation, trustee Original application November 1, 1943, Serial No. 508,601. Divided and this application July 22, 1946, Serial No. 685,467

4 Claims. (Cl. 192—56)

This invention relates to an overload torque release device having many applications in respect to positively releasing a driving connection upon an overload being applied to a driven member, and particularly in association with a spring clutch acting as the releasable driving connection between the driving and driven members, this application being a division of my application Serial No. 508,601, filed November 1, 1943, issued January 25, 1949, as Patent No. 2,459,972, entitled "Torque limiting device."

The invention is particularly useful and applicable in releasing a power drive so as to completely declutch the driving member from the driven member upon the torque reaching a predetermined amount, such as occurs upon the overloading of the driven member. Thus, as herein shown, the invention is applied to a power press, forging or stamping machine, such that in event of jamming or undue resistance, breakage will be eliminated by release and disengagement of the clutch upon excess pressure due to the overloading thereof.

Many other applications of the invention will be apparent, and in its simplified form it may be applied to stoker drives and like devices wherein clogging may ultimately resist movement of the driven member such as a screw feed, requiring complete release of the power drive therefor to avoid breakage or burning out of the driving motor.

The principal feature of the invention resides in employing a helical clutch spring having its load carrying end operatively connected with the driven member and normally out of clutching engagement with the driving member, the driving member having a releasable connection with the opposite or energizing end of the clutch spring, such as to normally energize said spring into clutching engagement with the driving member. A load sensitive means is provided which may yield upon an overload being applied to effect the release or disengagement of the energizing end of the clutch spring, thereby permitting it to return to its normal position free from clutching engagement.

A valuable characteristic and feature of this invention resides in the gradient progressive action of the coiled clutch spring such that the load carrying coil carries the greater percentage of the load with each succeeding coil towards the energizing end of the spring carrying a fractional part thereof until the load on the clutch releasing member at the energizing end of the spring carries only an exceedingly small fraction of the total load transmitted between the driving and driven members. This is of great advantage in that it requires very little force to cause the releasing member to effect the release of the clutch upon an overload being applied.

The full nature of the invention will be understood from the accompanying drawings and the following description and claims:

Fig. 1 is a central longitudinal section through the clutch control mechanism with parts broken away and parts in elevation.

Fig. 2 is a side elevation of a portion of the driving member.

Fig. 3 is a perspective view of the driving disk clutch element.

Fig. 4 is a perspective view of the driven disk clutch element.

In the drawings, for the purpose of illustrating one embodiment, the invention is shown as applied to heavy duty machines, such as a heavy press or hammer, the principal driving member comprising a belt driven fly wheel 10 and the principal driven member comprising a crank shaft 11. The driving wheel 10 is rotatably mounted on the hub 12 and drives said hub through a driving collar 13 which is in spring pressed cam engagement with a flange 14 formed on said hub. The driving relation between the driving collar 13 and hub 12 is controlled by the camming members 15 formed in spaced relation about and integral with the collar 13.

Said camming members 15 are yieldingly maintained in driving engagement with the flange 14 of said hub 12 by the load sensitive means consisting of a series of compression springs 16. Said springs are individually supported under compression against the driving collar 13 by the bolts 17. Said bolts are fixed transversely of said driving collar, but have free play in the camming openings 18 provided in said flange 14, and free axial movement in the driving collar 13.

This arrangement is such that the load sensitive springs 16 will be compressed upon an overloading torque being applied to the crank shaft 11. This will permit of relative movement between the fly wheel 10 and the hub 12 through slippage of the camming members 15 in their respective camming openings 18 provided in the flange 14.

Surrounding the hub 12 there is a spacing sleeve 19 slidably mounted thereon for engagement with a sliding ring 20, which abuts against a compression spring 21 held in place on the hub by a retaining plate 22. The hub is provided with a series of radial slots 23 through which the bolts 24 extend for locking the ring 20 to a driving disk clutch element 25, as shown in Fig. 3. Said element comprises a ring having a plurality of spaced lugs 26 secured about its clutch face, and is mounted within the hub so that it will be axially slidable by the bolts 24 into and out of engagement with its mating driven clutch element 27, as shown in Fig. 4. Said clutching element 27 is in the form of a helical collar having a shoulder 28 and a clutch face formed with a plurality of alternate projections and recesses 29 for receiving the lugs 26 in locking and driving engagement when said disk clutch is rendered effective.

The hub 12 is provided with an internal clutch surface 30 in which is mounted a clutch spring 31 having an inherent tendency to wrap down or contract out of clutching engagement therewith. Said clutch spring is shown with a series of longitudinally extending tapered slots 32 formed about its periphery for rendering it more sensitive to clutching and declutching action. The driven or energizing end of the spring 31 abuts the shoulder 28 of the helical clutch element 27, the end coil of the clutch spring lying directly against the face of said element, being riveted thereto. The opposite or load carrying end 33 of the spring engages an opposed shoulder on the flange of the driven sleeve 34 keyed to the spindle of the crank shaft 11.

In the operation of the above-described device, the parts are normally in driving relation, although at rest the clutch spring 31 is normally declutched until a driving load is applied. Thus, the drive is transmitted from the driving to the driven member immediately upon the load being applied, whereby the clutch spring 31 is expanded by the torque applied thereto through the clutch elements 25, 27. Thereupon the driving fly wheel 10 will drive the crank shaft 11 through interlocking engagement of the driving collar 13 with the flange 14, hub 12, spring clutch 31 and driven sleeve 34. Under normal driving conditions the compression spring 21 will maintain the disk clutching elements 25, 27 in their clutch engagement so that the clutch element 27 when driven through the driving collar 13 will energize the abutting end of the clutch spring 31 to expand and maintain said spring in clutching engagement with the clutch surface 30 of the hub 12 so as to rotate therewith and drive the driven sleeve 34 keyed to the spindle of the shaft 11.

Upon an overload of predetermined torque being applied, the expanding tension of spring 31 will be released so that it will return to its normal clutch disengaging position. This occurs through disengagement of the disk clutch elements 25, 27, relieving the expanding force applied thereby to the energizing end of the clutch spring 31. Such clutch disengagement is effected when the overload is such as to compress the load sensitive means, springs 16, through the camming action between the camming members 15 and the openings 18 of the flange 14. Such relative movement, through the camming action, causes the collar 13 to slide the sleeve 19 longitudinally of the hub, causing axial displacement of the collar 20 against the tension of the spring 21. Such displacement of the collar 20 acts to move the driving clutch element 25 out of clutching engagement with the element 27, whereupon the spring clutch under its inherent tension contracts out of clutching engagement with the clutch surface 30 of the hub 12. The hub 12 and the associated elements of the driving member are thereby declutched and completely released from driven connection with the driving sleeve 34 and shaft 11.

Therefore, it will be observed that in this device the clutch spring has an inherent tendency to completely disengage the clutch surface to permit release of the driven sleeve upon the resistance by the load sensitive means, springs 16, being overcome such as to permit of relative rotation between the driving member 10 and driven member 34. In this instance, such relative rotation through the camming action has the effect of causing an axial displacement of the driving collar 13 and the clutch elements 25, 27 for permitting complete disengagement of the clutch spring from its clutch engaging surface.

The mechanism as above described is particularly applicable to such mechanisms as involve a sudden momentary overload and of heavy duty, such as occurs upon the reciprocating parts meeting an obstacle or excessive resistance, it being noted that immediately upon the overload resistance being relieved, the clutch spring will again be energized to expanded clutch engaging position. Thus, the overload release is intermittently effected only so long at the overload conditions continue, such as to maintain the clutch elements 25, 27 out of engagement against the tension of springs 16 and 21.

It will be apparent that if it is desired to procure a permanent release or disconnection of the load from the source of power, any well known means may be applied to cause the collar 19 to stay in its released position against the force of the compression spring 21 until the operator moves the collar manually to the right, allowing lugs 26 to again engage the recesses 29. The well known spring loaded detent balls could be mounted in the periphery of the hub 12 directly under the sliding collar 19 to provide such permanent load release action.

It will be further noted that very little force is required to actuate the releasing element upon an overload being applied, such as to separate the clutch elements 25, 27. This is due to the character of the coiled spring wherein the major part of the load is transmitted through its load carrying end and a small fraction thereof through its energizing end to which the clutch element 27 is connected. For that reason the particular releasing element of the unit which completely brakes the torque line through the members, carries only a very small fraction of the torque load passing therethrough such as to greatly facilitate the releasing acting upon an overload being applied.

From the foregoing, it will be observed that the clutch spring 31 is normally relaxed free of clutching engagement with the driving member or hub 12. Upon torque being applied to the driving member 10, the releasing element in the form of clutch member 25, being normally engaged, the clutch spring will be energized into clutching and driving engagement with the hub. When an overload torque condition develops, the springs 16 and camming driving collar 13, which combined serve as the load sensitive means, will permit of relative rotation between the driving members 10 and 12, the latter being clutched to the driven member or sleeve 34. Such relative rotation axially displaces the releasing element—clutch member 25—to permit the clutch spring to relax free of clutching engagement and thereby release the sleeve 34 from the hub.

The invention claimed is:

1. An overload release device including a driving member, a driven member, said driving member having an internal cylindrical clutch surface, a cylindrical clutch spring mounted within said driving member normally free of clutching engagement adapted to be expanded into clutching engagement with said clutch surface, the load carrying end of said spring being in driving engagement with said driven member, a releasable connection between the opposite energizing end of said clutch surface and said driving member operable under torque load to effect expansion of said clutch spring into clutching engagement with said clutch surface, a yielding load sensitive spring on said driving member compressible upon overload and means operable upon compression of said load sensitive spring to displace said releasable connection and disconnect it from the energizing end of said clutch spring for permitting said spring to contract out of clutching engagement with said clutch surface.

2. An overload release device including a driving hub having a pocket to provide an internal clutch surface, a driven spindle freely extending into said pocket, a cylindrical clutch spring mounted about said spindle within said pocket normally out of engagement with the latter and with its load carrying end in driving contact with said spindle, a clutch element engageable with the opposite energizing end of said spring, a mating clutch element slidably movable on said hub into and out of clutching engagement with said clutch element, a spring normally maintaining said clutch elements in clutching engagement, a driving member carried by said hub operable to declutch said clutch elements, a driven member on said hub in camming engagement with said driving member, and a load sensitive spring for maintaining said last mentioned members in driving engagement while permitting relative rotation therebetween to cam said driving member axially of said hub to disengage said clutch elements upon overload of said spindle, whereby said spring clutch will be released from clutching engagement with said hub.

3. An overload release device including a driving member, a driven member, one of said members being provided with a clutch engaging surface, a coiled clutch spring normally out of engagement with said clutch engaging surface movable into clutch engagement therewith upon being energized, the load carrying coil of said spring being operatively connected with the other of said members, a load releasing element carrying only a fraction of the total torque load transmitted between said members movable into energizing engagement with the energizing end of said spring and carried by said first mentioned member for progressively energizing said spring into clutching engagement with its clutch engaging surface and releasable from said spring to permit said clutch to release said surface, and a load sensitive means carried by said first mentioned member in co-acting relation with said load releasing element to effect its release from said spring upon an overload torque being applied thereto.

4. An overload release device including a driving member, a driven member, said driving member being provided with a clutch engaging surface concentric with said other member, a helical clutch spring interposed between said members normally free from clutching engagement with said clutch surface movable into clutching engagement therewith, the load carrying end of said spring being secured to said driven member, an energizing element mounted on and rotatable with said driving member axially displaceable into and out of energizing engagement with the energizing end of said spring, a torque transmitting element adapted to transmit driving torque to said driving member, a driving collar mounted on said driving member in camming relation therewith operatively connected with said energizing element to disengage it from said clutch spring upon axial displacement thereof, and a load sensitive connection between said torque transmitting member and driving collar for permitting axial displacement of said collar relative to said driving member through the camming action therebetween upon an overload torque being applied to said driven member to effect said disengagement of said energizing element.

WILLIAM CARLETON STARKEY.

REFERENCES CITED

The following references are of record in the file of this patent:

UNITED STATES PATENTS

| Number | Name | Date |
| --- | --- | --- |
| 1,954,620 | Connell | Apr. 10, 1934 |
| 1,972,915 | Barton | Sept. 11, 1934 |
| 2,289,884 | Raber | July 14, 1942 |
| 2,459,972 | Starkey | Jan. 25, 1949 |